United States Patent
Kupferschmid et al.

[11] Patent Number: 5,988,335
[45] Date of Patent: Nov. 23, 1999

[54] CONTROL SYSTEM FOR DIVERTING OIL FROM A CLUTCH

[75] Inventors: Kent A. Kupferschmid, East Peoria; Rick A. Laylock, Washington; Timothy F. Nusz, Wyoming; Daniel J. Whiting, Bloomington, all of Ill.

[73] Assignee: Caterpillar Inc., Peoria, Ill.

[21] Appl. No.: 09/088,986

[22] Filed: Jun. 2, 1998

[51] Int. Cl.⁶ .................................................. B60K 41/22
[52] U.S. Cl. ........................................ 192/3.58; 192/3.57
[58] Field of Search ............................... 192/3.58, 113 R, 192/113 B, 3.57; 74/335

[56] References Cited

U.S. PATENT DOCUMENTS

| | | | |
|---|---|---|---|
| 3,300,004 | 1/1967 | Peterson | 192/48 |
| 3,773,157 | 11/1973 | Koch, Jr. et al. | 192/113 B |
| 3,823,802 | 7/1974 | Winzeler et al. | 192/113 B |
| 3,938,637 | 2/1976 | Murakami | 192/113 R |
| 4,004,670 | 1/1977 | Nerstad et al. | 192/105 A |
| 4,431,096 | 2/1984 | Kobayashi et al. | 192/3.57 |
| 4,465,167 | 8/1984 | Fujioka | 192/3.57 |
| 4,544,055 | 10/1985 | Kronstadt | 192/70.12 |
| 4,557,363 | 12/1985 | Golan | 192/113 B |
| 5,024,306 | 6/1991 | Fukui et al. | 192/3.57 |
| 5,131,431 | 7/1992 | Vullmahn | 137/625.23 |
| 5,301,922 | 4/1994 | Hayasaka | 251/283 |
| 5,350,047 | 9/1994 | Kimura et al. | 192/87.13 |
| 5,682,792 | 11/1997 | Liesener et al. | 74/335 |

*Primary Examiner*—Charles A Marmor
*Assistant Examiner*—Tisha D. Waddell
*Attorney, Agent, or Firm*—J. W. Burrows

[57] ABSTRACT

A control system diverts cooling and/or lubricating fluid from a selected one of a plurality of fluid actuated clutches in a transmission in response to the transmission being in a selected gear ratio. A diverter valve is placed between a source of cooling and/or lubricating fluid and the selected one of the fluid actuated clutches and operative to divert fluid therefrom in response to the transmission being placed in the selected gear ratio. A sensor arrangement is operative to sense the transmission gear ratio and deliver a signal to condition the diverter valve.

7 Claims, 2 Drawing Sheets

CONTROL SYSTEM FOR DIVERTING OIL FROM A CLUTCH

TECHNICAL FIELD

This invention relates generally to the control of cooling and/or lubricating fluid from a clutch or clutches within a transmission and more particularly to diverting the fluid from the clutch in response to the selected gear ratio.

BACKGROUND ART

It is well known to reduce the flow of cooling or lubrication flow to a clutch subsequent to the engagement of the clutch. Additionally it has been known to reduce the flow to a clutch when the speed of the engine increases beyond a predetermined level. As is known, as the speed of the clutch increases, the drag encountered with the clutch rotating in the oil is increased. In these known systems, special speed related sensors an/or velocity sensors were required to determine when to divert or block the flow of fluid to the appropriate clutch. It is desirable to provide a simple and reliable system that would divert cooling and/or lubricating fluid from selected clutches when the transmission of the machine is in one of selected gear ratios.

The subject invention is directed to overcoming one or more of the problems set forth above.

DISCLOSURE OF THE INVENTION

In one aspect of the present invention a control system is adapted to selectively divert a source of cooling and/or lubricating fluid from a disengaged one of a plurality of fluid actuated clutches in a machine transmission. The control system includes a diverter valve disposed between the source of cooling and/or lubricating fluid and a selected one of the fluid actuated clutches and a sensor arrangement operative to sense the gear ratio of the transmission and to condition the diverter valve to divert fluid flow from the selected one of the disengaged clutches in response to the transmission being in a selected gear ratio.

BEST MODE FOR CARRYING OUT THE INVENTION

Figures 1, 2:
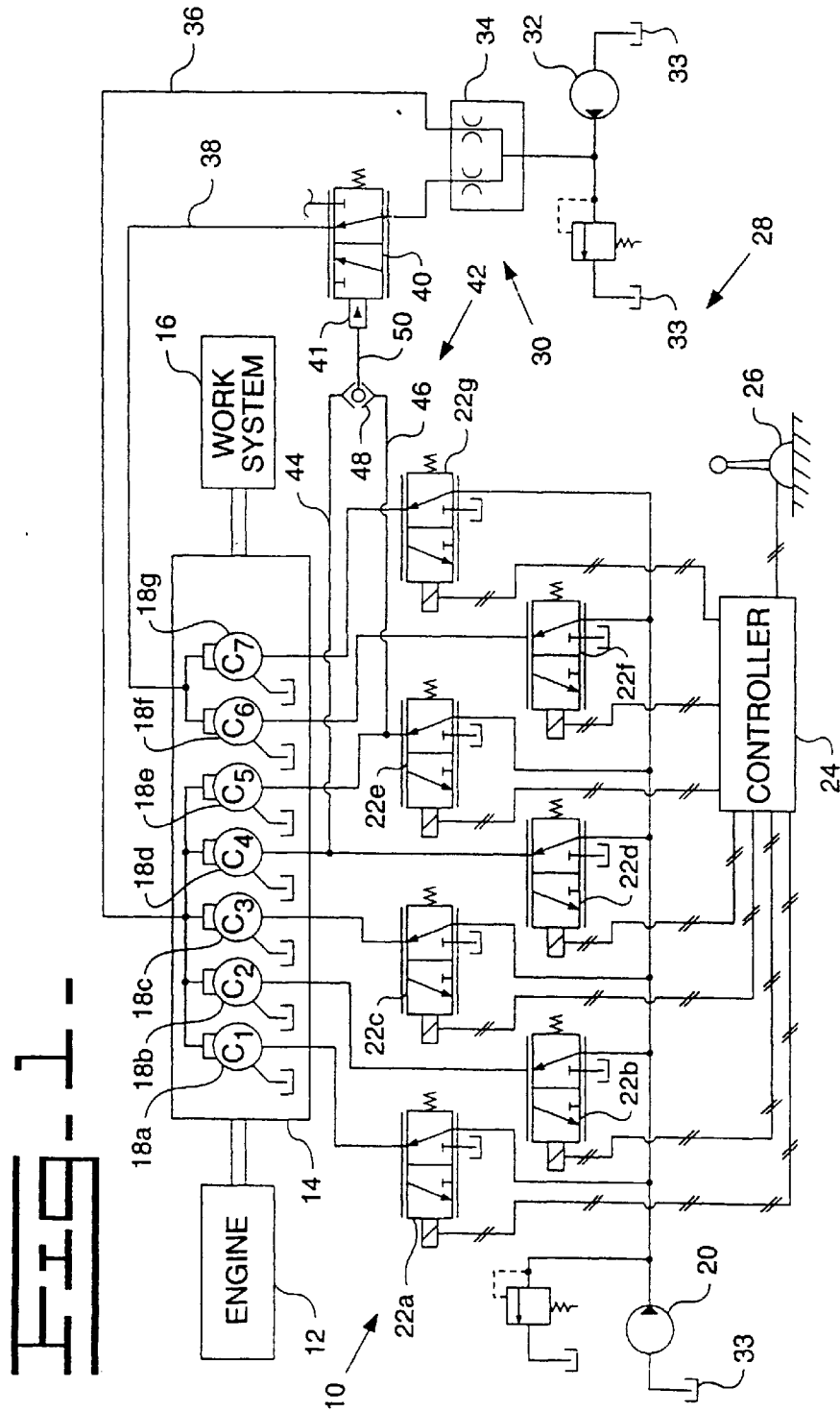
FIG. 1 is a schematic representation of a control system incorporating an embodiment of the present invention.
FIG. 2 is a table illustrating an example of a machine having a plurality of gear ratios and what gears that are engaged in each of the gear ratios.

Referring to the drawings and more particularly to FIGS. 1 and 2, a machine system 10 is illustrated and includes an engine 12 drivingly connected through a transmission 14, to a work system 16. The transmission 14, in a well known manner has a plurality of fluid actuated clutches $18_{a-g}$ that are associated with respective gear mechanisms (not shown) within the transmission 14. Engagement of selected ones of the clutches $18_{a-g}$ places the transmission 14 in a desired gear ratio. It is recognized that different numbers of clutches could be used to obtain different numbers of gear ratio. As illustrated in the table of FIG. 2, the subject transmission 14 has seven forward gear ratios, neutral and a reverse gear ratio. Furthermore, in the subject transmission 14, two different clutches must be engaged for each gear ratio. Some transmissions require engagement of only one clutch for each gear ratio. The subject transmission 14 includes seven fluid actuated clutches $18_{a-g}$.

In order to control the engagement of the respective clutches $18_{a-g}$ a source of pressurized fluid 20 is connected to the respective clutches $18_{a-g}$ through respective solenoid operative proportional valves $22_{a-g}$. An electrical controller 24 is connected to each of the respective solenoid operative proportional valves $22_{a-g}$ and operative to control movement of each valve in response to movement of a command input mechanism 26. Movement of the command input mechanism 26 by the operator determines the desired speed ratio of the transmission 14.

A control system 28 is provided to control the flow of cooling and/or lubricating fluid to selected ones of the clutches $18_{a-g}$. The control system 28 includes a cooling and/or lubricating circuit 30 having a source of cooling and/or lubricating fluid 32 that receives fluid from a reservoir 33, a flow divider valve 34, a first conduit 36 connected between the flow divider valve 34 and selected ones $18_{a-e}$ of the fluid actuated clutches and a second conduit 38 connected between the flow divider valve 34 and other ones $18_{f-g}$ of the fluid actuated clutches. Fluid flow from the source of cooling and/or lubricating flow 32 serves to cool and/or lubricate the associated clutches.

The control system 28 also includes a diverter valve 40 disposed in the second conduit 38 and operative to pass fluid therethrough to the other ones of the clutches $18_{f-g}$ or divert the fluid therefrom. The diverter valve 40 is spring biased to a first position at which fluid flow is passed therethrough to the clutches $18_{f-g}$ and movable towards a second position at which the fluid from the source of cooling and/or lubricating fluid 32 is diverted away from the clutches $18_{f-g}$. The diverter valve 40 is movable towards its second position in response to receipt of a pressurized fluid within an actuating chamber 41 located on the end opposite the spring bias. The diverted fluid may be directed to the reservoir 33 or to some other low pressure function within the system, such as, lubricating other components.

A sensor arrangement 42 is provided in the control system 28 to sense the gear ratio of the transmission 14. The sensor arrangement 42 includes first and second conduits 44,46 connected to selected ones $18_{d,e}$ Of the fluid actuated clutches, a resolver valve 48 operative to resolve the higher pressure between the first and second conduits, and a conduit 50 that delivers the resolved pressure signal to the actuating chamber 41 of the diverter valve 40.

Figure 3:
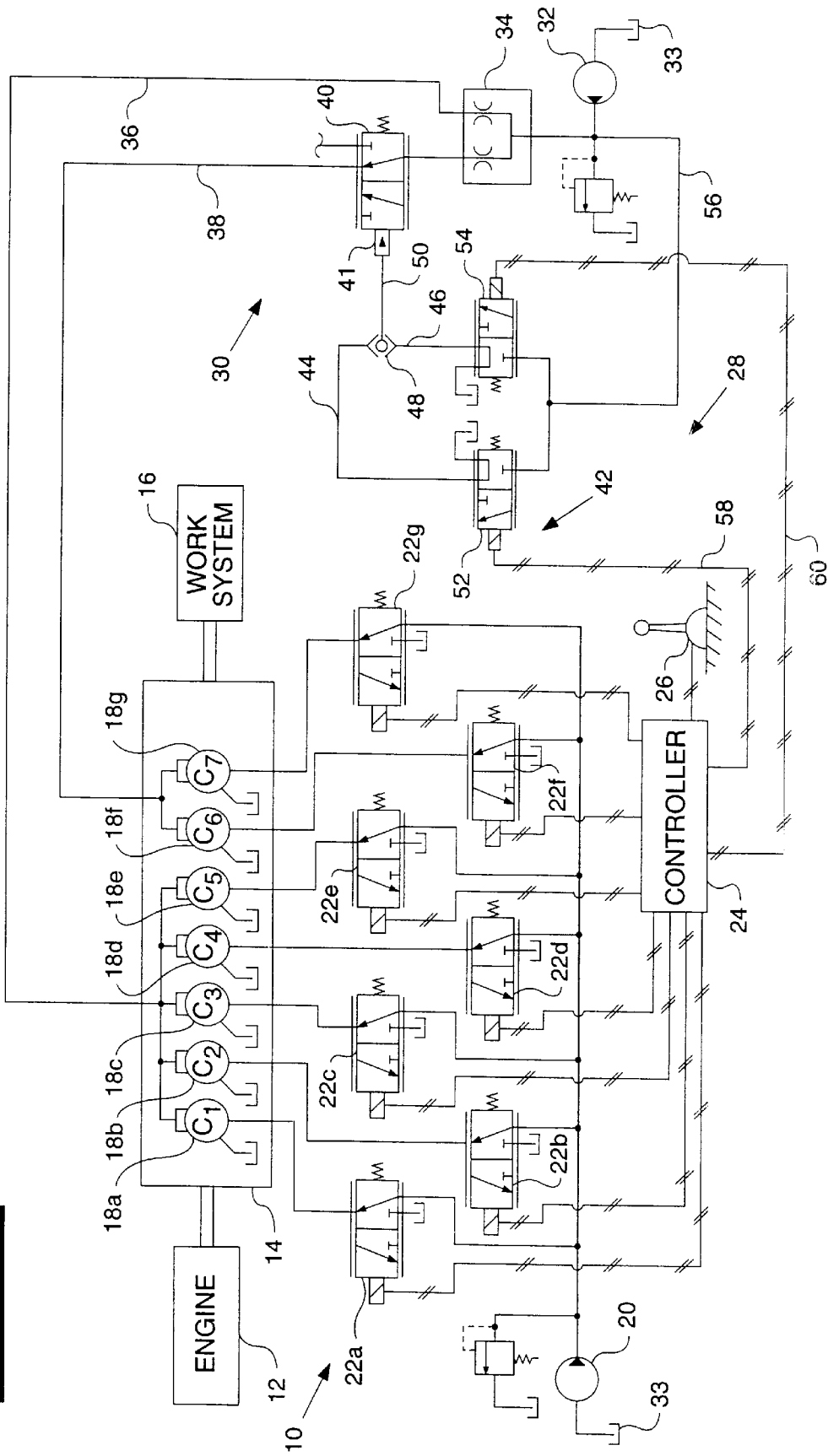
FIG. 3 is a schematic representation of a control system incorporating another embodiment of the present invention.

Referring to FIG. 3, another embodiment of the subject invention is disclosed. Like elements have like element numbers. In the embodiment of FIG. 3, the first and second conduits 44,46 are disconnected from the selected fluid actuated clutches $18_{d,e}$ and connected to the source of cooling and/or lubricating fluid 32 through respective first and second two position solenoid operated valves 52,54 and a pressure conduit 56. Each of the first and second two position solenoid operated valves 52,54 are spring biased to a position at which the flow from the source of cooling and/or lubricating fluid 32 is blocked and the fluid in the conduits 44,46 are in communication with the reservoir 33. Each valve 52,54 is movable towards a second position at which the source 32 is in communication with the diverter valve 40 through the appropriate conduits 44,46, the resolver 48 and the conduit 50. Each valve 52,54 is movable towards its second position in response to an electrical signal received from the electrical controller 24 through electrical lines 58,60.

It is recognized that the source of cooling and/or lubricating fluid 32 and the source of pressurized fluid 20 could be the same. Likewise, if two different sources is being utilized, the source providing pressurized fluid to the solenoid valves 52,54 of FIG. 3 could be supplied by the source of pressurized fluid 20 instead of the source of cooling and/or lubrication fluid 32.

INDUSTRIAL APPLICABILITY

In the operation of the embodiment of FIG. 1, the operator selects a desired gear ratio by moving the command input mechanism 26 to the desired position. For example, if the operator selects gear ratio 2, the controller 24 directs electrical signals to the proportional valves $22_{b,f}$. The proportional valves $22_{b,f}$ move to a position to direct pressurized fluid to the second and sixth fluid actuated clutches $18_{b,f}$ for engagement thereof. As set forth in the table of FIG. 2, engagement of the second and sixth clutches $18_{b,f}$ places the transmission 14 in its second gear ratio. During operation of the machine 10 in its second gear ratio, cooling and/or lubricating fluid is continuously being supplied to all of the fluid actuated clutches $18_{a-g}$.

When the operator changes or selects another gear ratio, for example, gear ratio 5, the controller 24 causes the proportional valves $22_{b,f}$ to interrupt the flow of pressurized fluid to the second and sixth clutches $18_{b,f}$ and vent the fluid from the second and sixth clutches $18_{b,f}$ to the reservoir 33 thus disengaging the second and sixth clutches $18_{b,f}$. At substantially the same time, the controller 24 directs electrical signals to the proportional valves $22_{a,e}$ moving them to a position to controllably direct pressurized fluid to the first and fifth clutches $18_{a,e}$ for engagement thereof. As noted from the table of FIG. 2, engagement of the first and fifth clutches $18_{a,e}$ places the transmission 14 in its fifth gear ratio. Since the fifth gear ratio is a higher speed ration for the machine 10, various ones of the clutches, such as, for example, sixth and seventh clutches $18_{f,g}$, are turning in the cooling and/or lubricating fluid at a high velocity. This causes undue "drag" forces that take extra power from the engine 12. Since the sixth and seventh clutches $18_{f,g}$ are not being used, the cooling and/or lubricating fluid being directed thereto is diverted.

As noted from FIG. 1, the conduit 46 is connected to the fifth clutch 18e. The pressurized fluid that actuated fifth clutch 18e is directed through the conduit 46, the resolver 48, and the conduit 50 to the actuating chamber 41 of the diverter valve 40. This pressurized fluid moves the diverter valve 40 towards its second position to divert the flow from the source of cooling and/or lubricating fluid 32 away from the sixth and seventh clutches $18_{f,g}$. Consequently, as long as the transmission 14 is operating in its fifth gear ratio, the cooling and/or lubricating fluid from the source 32 is diverted away from the sixth and seventh clutches $18_{f,g}$ thus eliminating the drag forces.

If the operator selects gear ratio 7, the controller 24 functions as above to disengage the fifth gear ratio and engage the seventh gear ratio. As noted from a review of the table of FIG. 2, the first clutch 18a is used in both the fifth and seventh gear ratios. Consequently, the fifth clutch 18e is disengaged and the fourth clutch 18d is engaged. With the first and fourth clutches engaged, the transmission 14 is in its seventh gear ratio. With the fourth clutch 18d engaged, pressurized fluid is directed through the conduit 44 to the actuating chamber 41 of the diverter valve 40 moving it to divert the cooling and/or lubricating fluid from the sixth and seventh clutches 18f,g to again eliminate drag forces therein.

From a review of the table of FIG. 2, it is determined that cooling and/or lubricating fluid is diverted from the sixth and seventh clutches $18_{f,g3}$ whenever the transmission 14 is operated in any of the gear ratios 4–7. This is evident since any time either of the fourth or fifth clutches $18_{d,e}$ is engaged, the diverter valve 40 is moved to its diverting position. It is recognized that if it is desirable to divert cooling and/or lubricating fluid from the sixth and seventh clutches $18_{f,g}$ during operation in the third gear ratio, a conduit could be connected to the first clutch $18_a$ and the pressure signal therein be resolved with the signals in conduits 44,46 and directed to the actuating chamber 41 of the diverter valve 40.

Referring to the operation of the embodiment of FIG. 3, the operation of the transmission 14 and the control of the fluid actuated clutches $18_{a-g}$ is the same as that described above. The major difference is that the sensor arrangement 42 is different. In the embodiment of FIG. 3, the controller 24 monitors the operative gear ratio at all times and when the command input mechanism 26 is in, for example, the sixth gear ratio, an electrical signal is directed to the solenoid operated two position valve 52 moving it to the second position when directs pressurized fluid to the actuating chamber 41 of the diverter valve 40 thus diverting cooling and/or lubricating fluid away from the sixth and seventh clutches $18_{f,g}$.

Likewise, if the seventh gear ratio is selected, the controller directs an electrical signal to the other two position solenoid operated valve 54 moving it to its second position thus direct pressurized fluid to the actuating chamber 41 of the diverter valve 40. If it is desired to divert fluid from the sixth and seventh clutches $18_{f,g}$ when the transmission 14 is in its fourth or fifth gear ratios, additional two position valves could be added and function as set forth above. Additionally, it is recognized that the control system of FIG. 3 would be workable with only one two position solenoid operated valve without departing from the essence of the subject invention. If only one solenoid valve is used, the electrical signals that represent the selected gear ratios requiring fluid diversion would be resolved and a single electrical signal would be directed to the single solenoid valve to initiate movement of the diverter valve 40 to divert the flow from the sixth and seventh clutches $18_{f,g}$.

Additionally it is recognized that the diverter valve 40 could be a solenoid operated and the single electrical signal could be directed to the solenoid operated diverter valve 40.

In view of the foregoing, it is readily apparent that the control system 28 herein provides a simple and effective way of diverting cooling and/or lubricating fluid from selected ones of the clutches $18_{a-g}$ in response to the transmission 14 being operated in selected ones of its gear ratios.

Other aspects, objects and advantages of the invention can be obtained from a study of the drawings, the disclosure and the appended claims.

We claim:

1. A control system adapted to selectively divert a source of cooling and/or lubricating fluid from a disengaged one of a plurality of fluid actuated clutches in a machine transmission, the control system comprising:

a diverter valve disposed between the source of cooling and/or lubricating fluid and a selected one of the fluid actuated clutches; and a sensor arrangement operative to sense the gear ratio of the transmission and to condition the diverter valve to divert fluid flow from the selected one of the disengaged clutches in response to the transmission being in a selected gear ratio, wherein the diverter valve has an actuating chamber and the sensor arrangement includes a fluid connection between the actuating chamber of the diverter valve and an actuating pressure line connected to a second one of the plurality of the fluid actuated clutches, the diverter valve being moved to the flow diverting position in response to the second one of the fluid actuated clutches being pressurized.

2. The control system of claim 1 wherein the sensor arrangement includes a second fluid connection between the actuating chamber of the diverter valve and a third one of the plurality of fluid actuated clutches, the diverter valve being moved to the flow diverting position in response to the third one of the fluid actuated clutches being pressurized.

3. The control system of claim 2 wherein the cooling and/or lubricating fluid is directed through the diverter valve to a fourth one of the plurality of fluid actuated clutches and the cooling and/or lubricating fluid to the fourth fluid actuated clutch is diverted therefrom in response to the second or third fluid actuated clutch being actuated.

4. The control system of claim 3 wherein a resolver valve is disposed between the connections between the second and third clutches and the actuating chamber of the diverter valve and operative to sense the higher pressure between the second and third clutches and direct the higher pressure to the actuating chamber of the diverter valve and check the pressurized flow from being directed to the connection of the lower pressure clutch.

5. The control system of claim 1 wherein the control system includes an electrical controller and a command input mechanism operative to select the desired gear ratio and direct an electrical signal to the controller representative of the desired gear ratio, a solenoid actuated valve is disposed between a source of pressurized fluid and the actuating chamber of the diverter valve and operative in response to selection of a predetermined gear ratio to divert cooling and/or lubricating fluid away from the selected one of the fluid actuated clutches.

6. The control system of claim 5 wherein the source of cooling and/or lubricating fluid is connected through the diverter valve to another one of the fluid actuated clutches, a second solenoid actuated valve is disposed between the source of pressurized fluid and the actuating chamber of the diverter valve and operative in response to selection of another predetermined gear ratio to divert cooling and/or lubricating fluid away from the selected one of the fluid actuated clutches and the cooling and/or lubricating fluid to the other one of the fluid actuated clutches is diverted therefrom in response to the transmission being in the other predetermined gear ratio.

7. The control system of claim 6 wherein the source of cooling and/or lubricating fluid and the source of pressurized fluid is the same source.

* * * * *